(No Model.)
J. H. WEBB.
SPOKE SOCKET.
No. 331,591.  Patented Dec. 1, 1885.
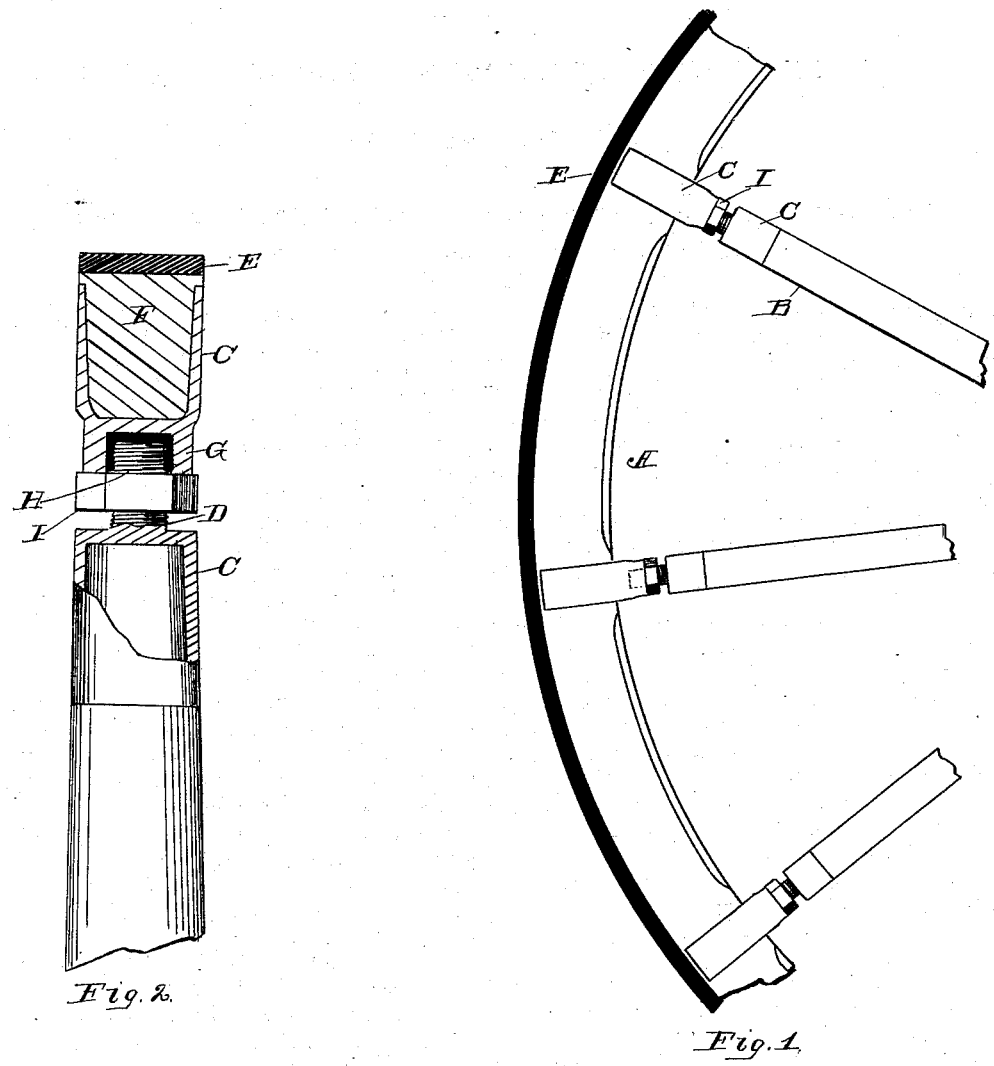
Witnesses:
Robert Kirk
Dugald McKillop
Inventor:
J. Harvy Webb
By
Attorney.

UNITED STATES PATENT OFFICE.

J. HARRY WEBB, OF MIDDLE SETTLEMENT, ARKANSAS.

SPOKE-SOCKET.

SPECIFICATION forming part of Letters Patent No. 331,591, dated December 1, 1885.

Application filed July 2, 1885. Serial No. 170,463. (No model.)

*To all whom it may concern:*

Be it known that I, J. HARRY WEBB, of Middle Settlement, in the county of Van Buren and State of Arkansas, have invented a new and useful Improvement in Wheels, which improvement is fully set forth in the following specification and accompanying drawings, in which—

Figure 1 is a side view of my improved wheel, and Fig. 2 is an enlarged sectional view showing the method of connecting the spoke with the felly.

The present invention relates to an improvement in wheels, wherein I provide a clip connecting with the felly, the inner part elongated somewhat and provided with a threaded opening to receive therein a threaded stud, forming a socket on the ends of the spoke, whereby the spoke may be extended, so as to tighten the felly and tire, all of which will now be set forth in detail.

In the accompanying drawings, A is a wheel having the hub formed in any convenient manner, as are also the spokes B, connecting therewith. The spokes B are made somewhat shorter than in the ordinary wheel, and are provided at their outer ends with a metal socket, G, fitted tightly thereon, the outer end of said socket being provided with a threaded stud, D. The tire E and the felly F are formed as usual.

Instead of the ordinary tenon on the end of the spoke and corresponding recess within the felly, I provide a clip, C, designed to clasp the said felly, with its inner end, G, somewhat reduced, and having a recess, H, centrally therein. A polygonal nut, I, is placed upon the threaded lug D, and the outer end of the said lug placed within the recess H of the clip C, so that when the said nut is revolved upon the lug the spoke may be contracted or expanded, and thus tighten or otherwise adjust the felly and tire.

I am aware that it is not new to construct a spoke in two parts or sections, and to provide them with an adjusting device, which facilitates their construction and expansion, and I therefore disclaim the broad idea of such construction; but What I believe to be new, and desire to secure by Letters Patent, is—

The clip C, which clasps the felly, and which is provided with a socket, G, at its rear end, and also having an imperforate partition between the part G and the outer socket, (which accommodates the felly,) all cast in a single piece, in combination with the socket on the spoke B, said socket being provided with a closed end, said end also having a threaded bolt, D, and the nut I, whereby the felly and spoke are both firmly seated in the bottoms of their sockets and the length of the spoke may be adjusted, all constructed and combined to operate substantially as described.

In testimony that I claim the foregoing I have hereunto set my hand this 5th day of June, 1885, in the presence of witnesses.

J. HARRY WEBB.

Witnesses:
JOHN HANDY,
SAM W. SIMPSON.